(12) United States Patent
Peuker et al.

(10) Patent No.: US 12,209,992 B2
(45) Date of Patent: Jan. 28, 2025

(54) METHOD AND DEVICE FOR ULTRASONIC INSPECTION OF COMPOSITE PARTS, IN PARTICULAR MADE FROM CARBON FIBER REINFORCED PLASTICS, DEVICE AND COMPUTER PROGRAM

(71) Applicant: Airbus Operations GmbH, Hamburg (DE)

(72) Inventors: Patrick Peuker, Hamburg (DE); Timo Dallman, Hamburg (DE); Tom Blechschmidt, Hamburg (DE); Guido Kuhlmann, Hamburg (DE); Hubert Temmen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 286 days.

(21) Appl. No.: 17/876,830

(22) Filed: Jul. 29, 2022

(65) Prior Publication Data

US 2023/0037495 A1 Feb. 9, 2023

(30) Foreign Application Priority Data

Jul. 30, 2021 (EP) .................................. 21188792

(51) Int. Cl.
  *G01N 29/04* (2006.01)
  *G01N 29/11* (2006.01)
(52) U.S. Cl.
  CPC ........... *G01N 29/043* (2013.01); *G01N 29/11* (2013.01)
(58) Field of Classification Search
  CPC . G01N 29/00; G01N 29/04–12; G01N 29/043
  See application file for complete search history.

(56) References Cited

U.S. PATENT DOCUMENTS

| 5,343,750 A * | 9/1994 | Bashyam | ........... G01N 29/0645 |
| | | | 73/635 |
| 7,640,811 B2 * | 1/2010 | Kennedy | .............. G01N 29/265 |
| | | | 73/602 |

(Continued)

FOREIGN PATENT DOCUMENTS

GB         2 559 154 A1     8/2018

OTHER PUBLICATIONS

Hentschel D. et al, "Ultrasonic Inspection Technique for NDE of Fiber Composite Material," Proceedings of SPIE: Nondestructive Characterization for Composite Materials, Aerospace Engineering, Civil Infrastructure and Homeland Security, Apr. 9, 2010, vol. 7649.

(Continued)

*Primary Examiner* — Nguyen Q. Ha
(74) *Attorney, Agent, or Firm* — KDW Firm PLLC

(57) ABSTRACT

A method for ultrasonic inspection of composite parts includes providing a composite part to be inspected with a plurality of layers, determining the runtime and/or attenuation of an ultrasonic signal propagating through the composite part to be inspected, providing the runtime and/or attenuation of the ultrasonic signal propagating through a reference composite part, subtracting the runtime and/or attenuation of the ultrasonic signal in the reference composite part from the runtime and/or attenuation of the ultrasonic signal in the composite part to be inspected, or vice versa, and determining from the result of the subtraction one or more missing and/or additional layers in the inspected composite part. The difference of the runtime and/or attenuation of the ultrasonic signal in the inspected composite part relative to the reference composite part, and/or the difference of the thickness between the composite part and the reference part, is/are visualized.

12 Claims, 4 Drawing Sheets

(56) References Cited

U.S. PATENT DOCUMENTS

| 8,820,164 | B2* | 9/2014 | Voor, Jr. | G01N 29/11 |
| | | | | 73/614 |
| 12,025,432 | B2* | 7/2024 | Humfeld | B29C 70/386 |
| 2003/0101007 | A1 | 5/2003 | Dubois et al. | |
| 2009/0303064 | A1 | 12/2009 | Labreck et al. | |
| 2017/0089866 | A1 | 3/2017 | Kollgaard | |

OTHER PUBLICATIONS

Fromme: "Composite structures defect imaging", Proceedings of SPIE, US, vol. 10600, Mar. 27, 2018.
European Search Report for U.S. Appl. No. 21/188,792 dated Dec. 1, 2021.

* cited by examiner

PRIOR ART

METHOD AND DEVICE FOR ULTRASONIC INSPECTION OF COMPOSITE PARTS, IN PARTICULAR MADE FROM CARBON FIBER REINFORCED PLASTICS, DEVICE AND COMPUTER PROGRAM

CROSS-REFERENCE TO RELATED APPLICATION

This application claims priority to Patent Application No. EP 21188792.2 filed Jul. 30, 2021, the entire disclosure of which is incorporated by reference herein.

TECHNICAL FIELD

The disclosure herein relates to a method and a device for ultrasonic inspection of composite parts, which are in particular made from carbon fiber reinforced plastics. Further, the disclosure herein relates to a computer program for ultrasonic inspection of composite parts, in particular made from carbon fiber reinforced plastics.

BACKGROUND

Composite parts comprise e.g. a plurality of single layers made from carbon fiber reinforced plastics, i.e. carbon fibers within a resin matrix. These layers are laminated automatically or by a machine until they reach a predetermined target thickness. One layer may have for example a thickness of 0.25 mm. Typically, the thickness of a layer is between 0.125 mm and 0.25 mm. It may also be more, e.g. 0.35 mm in case that the layer is a fabric or mesh. The layers may have different orientations. It is important that the part or component reaches its target geometry and thickness, and that its inner quality is assured.

FIG. 4 shows as an example a wing element 40 of an aircraft, which is formed by a high number of layers or plies laid one upon the other. In this example, a sequence is shown which comprises a first ply 111, a second ply 112 and a third ply 113. Each ply is laid by a number of courses as indicated by arrows within ply 113.

The laminate thickness has tolerances which depend on the thickness of the component. Usually the layer thickness is within or lower than the tolerances. That means that a layer could be missing, e.g. due to an interruption of the lamination process or another exceptional event, but this is not detected because it disappears in the tolerances of the part or component. However, the missing layer is very important for the statics of the component and must not be missing.

Known tests of components or parts use an ultrasonic device which works according to the known ultrasonic principle. A component is inspected with an ultrasonic signal and the measured signal can be evaluated in view of faults.

However, the known tests cannot determine that all necessary layers are provided in the component or part which is inspected. There may be portions where layers are missing, and there may also be portions where there are more layers than planned according to the design specification.

SUMMARY

It is an object of the disclosure herein to provide a method and a device for ultrasonic testing of composite parts which allow to determine whether a layer within a composite part, in particular made from carbon fiber reinforced plastics, is missing, or if a layer is present which should not be there. Further, the method and device should allow the detection of other features of the inspected composite part which may reduce its quality, like e.g. a delamination, a porosity or a foreign object debris.

The object is achieved by the subject matter herein. Advantageous embodiments are disclosed herein.

The disclosure herein provides a method for ultrasonic inspection of composite parts, comprising the steps: providing a composite part to be inspected, the composite part comprising a plurality of layers; determining the runtime and/or attenuation of an ultrasonic signal propagating through the composite part to be inspected; providing the runtime and/or attenuation of an ultrasonic signal propagating through a reference composite part; subtracting the runtime and/or attenuation of the ultrasonic signal in the reference composite part from the runtime and/or attenuation of the ultrasonic signal in the composite part to be inspected, or vice versa; and determining from the result of the subtraction one or more missing and/or additional layers in the inspected composite part.

The method is in particular applicable for composite parts which shall be inspected by non-destructive testing (NDT). The disclosure herein provides in particular a non-destructive testing or inspection method which allows to detect missing layers in composite parts, like e.g. fiber reinforced plastic layers, in particular carbon fiber reinforced plastic (CFRP) layers, and/or metal layers in particular for lightning protection, like e.g. expanded copper foil (ECF) layers. The composite part is in particular a CFRP part, i.e. it is made from CFRP.

Further deviations of the inner quality of the part are detected by the method, like e.g., porosity, delamination and/or foreign object debris.

Preferably, NDT raw data are used to detect missing layers in composite parts. But the method is also applicable for subtracting images like e.g. jpg files or similar.

In particular, ultrasonic data of the inspected composite part and of the reference part are subtracted from each other. In other words, the ultrasonic data of one part or cover, like e.g. the reference part or cover, is subtracted from another part or cover, like e.g. the inspected part or cover. Of course, the subtraction may also be vice versa, i.e. the ultrasonic data of the inspected part may be subtracted from the ultrasonic data of the reference part.

Preferably, the method comprises the step of visualizing in an image of the inspected composite part the difference of the runtime and/or attenuation of the ultrasonic signal in the inspected composite part relative to the reference composite part, and/or the difference of the thickness between the inspected composite part and the reference part.

In particular, the difference of the subtracted data is used as an indicator for a missing and/or additional layer, and this can be visualized in the image or picture. Preferably this method is automated by artificial intelligence.

For example, deviations of the signal attenuation and/or the signal runtime in the inspected composite part with respect to the reference part is visible in the image of the inspected composite part.

Preferably, an image of the inspected composite part is generated, the image indicating for different coordinates a color value representing the deviation of the attenuation and/or run time of the ultrasonic signal in the inspected composite part compared to the reference composite part.

The image is for example a top view of the inspected composite part. The color value is e.g. a pixel value.

Preferably, pixel values for coordinates in an image of the reference part are compared to and/or subtracted from pixel values at the same coordinates in an image of the inspected part, wherein the pixel values represent the attenuation and/or runtime of the ultrasonic signal in the respective part.

Preferably, the runtime and/or attenuation determined for the inspected composite part is provided as reference data for the inspection of one or more further composite parts.

Preferably, the composite part to be inspected is scanned with the ultrasonic signal, and the determined run time and/or attenuation of the signal is stored as a 2-dimensional matrix for the step of subtraction. Thus, the thickness at various positions or across the whole composite part can be determined.

Preferably, differences of the thickness between the inspected composite part and the reference part are determined from the ultrasonic data of the inspected composite part.

Preferably, the thickness differences between the inspected part and the reference part are compared with the thickness of a layer of the inspected composite part to detect a missing or an additional layer.

Preferably, 2-dimensional patterns are determined from the deviations of the runtime and/or attenuation of the ultrasonic signal in the inspected composite part compared to that in the reference composite part, in order to identify areas of missing or additional layers and/or areas with reduced quality.

According to an aspect of the disclosure herein, a device for ultrasonic inspection of composite parts is provided, comprising an ultrasonic system designed for determining the runtime and/or attenuation of an ultrasonic signal propagating through a composite part to be inspected; a computer unit designed for subtracting a runtime and/or attenuation of an ultrasonic signal propagating through a reference composite part from the runtime and/or attenuation of the ultrasonic signal determined for the composite part to be inspected, or vice versa, and for determining from the result of the subtraction one or more missing and/or additional layers in the inspected composite part.

Preferably, the device further comprises display device(s) to indicate areas of the inspected composite part where a missing and/or additional layer and/or a deviation of the inner quality of the inspected composite part is determined by the subtraction.

Preferably, the device is designed for executing the method according to the disclosure herein.

According to a further aspect, the disclosure herein provides a computer program for ultrasonic inspection of composite parts, comprising program steps for subtracting a runtime and/or attenuation of an ultrasonic signal propagating through a reference composite part from a runtime and/or attenuation of an ultrasonic signal in a composite part to be inspected, or vice versa, and for determining from the result of the subtraction one or more missing and/or additional layers in the inspected composite part.

Preferably, the computer program is designed for executing the method according to the disclosure herein.

In particular, the principle idea of the disclosure herein is to use ultrasonic inspection data and to analyse it by a subtraction, which means that one or more components or parts are compared with the component or part to be inspected, and preferably to visualize it in a way that allows a quick judgement whether the number of layers are according to the specification of the part and whether there are indications for portions of the inspected part having a reduced inner quality.

BRIEF DESCRIPTION OF THE DRAWINGS

Embodiments of the disclosure herein are described in more detail with reference to the accompanying schematic drawings.

DETAILED DESCRIPTION

A preferred example of the method according to the disclosure herein is explained in the following with reference to FIGS. 1 through 3.

Figure 1:
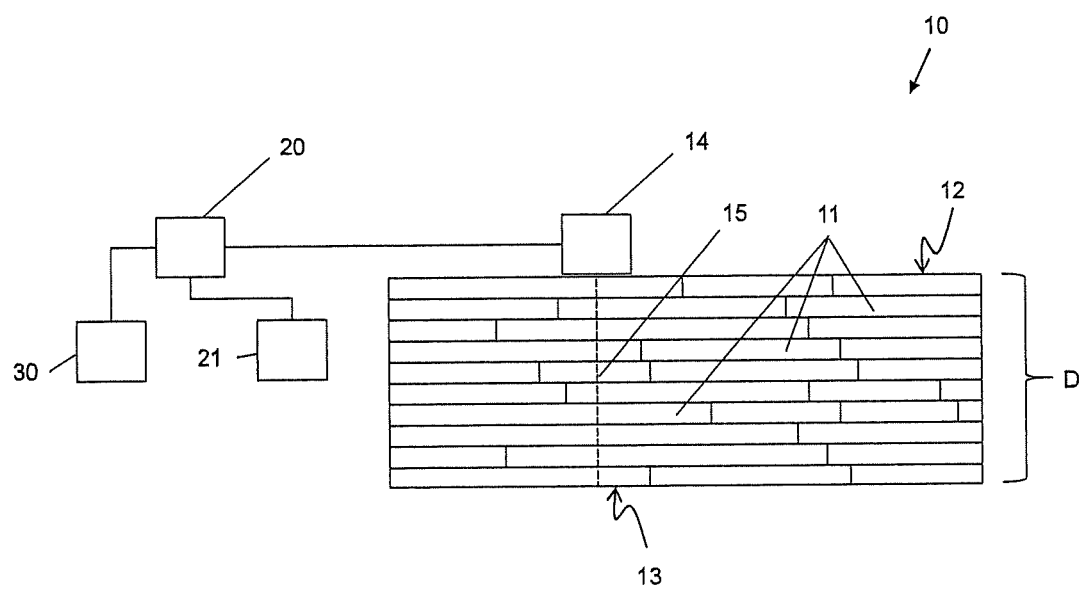
FIG. 1 depicts a device for ultrasonic non-destructive inspection according to a preferred embodiment of the disclosure herein during inspection of a composite test part.

Referring to FIG. 1, a composite part 10 which shall be inspected is provided. The composite part 10, which is also called part to be inspected or test part, comprises a plurality of layers 11. The composite or test part 10 is a CFRP part, i.e. it is made from carbon fiber reinforced plastics. Test part 10 in this example is a skin element of an aircraft wing and has a thickness D of 2.5 mm, with a ply thickness of 0.25 mm. (Step 1).

An ultrasonic inspection system 14 which is designed for determining the runtime and/or attenuation of an ultrasonic signal 15 propagating through test part 10 is arranged on one side of the test part 10, in this example on its upper surface 12.

The ultrasonic system 14 sends the ultrasonic signal 15 from upper surface 12 into the test part 10 so that it propagates through it.

The ultrasonic signal 15 is reflected at the bottom side 13 of test part 10 and is detected by ultrasonic system 14 to which the signal 15 returns after it has propagated forward and back through test part 10. The runtime of the signal 15 on its way through composite part 10 and the amplitude and/or attenuation of signal 15 is measured.

In this way, the upper surface 12 of composite part 10 is scanned with the ultrasonic system 14, so that for each pair of coordinates of surface 12 ultrasonic data of the ultrasonic signal 15 is collected (Step 2).

In general, it is also possible to measure the runtime and attenuation of an ultrasonic signal which passes only in one direction through the test part, i.e. without being reflected.

In addition, a runtime and/or an attenuation of an ultrasonic signal propagating through a reference composite part is provided, which is not visible in the figure. The reference composite part, which is also named reference part, is built equal to the test part 10 to be inspected. The ultrasonic signal used for the reference part has the same properties or characteristics and is applied in the same way as for the test part 10 (Step 3).

Now, the runtime and/or attenuation of the ultrasonic signal measured in the reference part is subtracted by a computer unit 20 from the runtime and/or attenuation of the ultrasonic signal 15 measured in the test part 10, or vice versa. That means, that it is also possible to subtract the runtime and/or attenuation of the ultrasonic signal 15 in the test part 10 from the runtime and/or attenuation of the ultrasonic signal in the reference part.

From the result of the subtraction, one or more missing and/or additional layers in the inspected composite test part 10 are determined, and also other deviations of the inner quality can be determined, like e.g. a delamination, a porosity or a foreign object debris (Step 4).

In Step 2 described above, signal propagation times are measured at different positions of test part 10. Via the speed of sound in test part 10, the thickness at the different positions is determined. The propagation time may be measured for the sound waves running one way through the inspected part 10 or for sound waves running forward and back in the inspected part.

An ultrasonic scan provides across the 2-dimensional surface 12 of test part 10 a 1-dimensional thickness measurement at defined points or locations. The data representing the thickness of test part 10 is stored in the form of a first matrix $M_{i,j}$ (1) for further processing in computer unit 20. A similar measurement of another part, which is the reference part, provides a second matrix $M_{i,j}$ (2) as a nominal reference. By the subtraction of the measurement results according to $\Box M_{i,j}$=Mid (2)–Mid (1), the difference of the thickness is determined at the various points or locations within the test part 10.

Ideally, the elements of the value matrix are very small. If the difference in thickness has the same magnitude as the thickness of a single layer 11 of test part 10, it indicates a missing layer or an additional layer at the respective location, depending on whether the difference is plus or minus. Further anomalies in thickness like e.g. delamination are made visible as well.

Preferably the dispersion of the data is taken into account. If it is smaller than the layer thickness, the method provides a greater accuracy.

For the data evaluation a statistic analysis is preferably used for determining two-dimensional patterns on the test part 10, e.g. by pattern recognition. Single missing or additional layers are e.g. identified by using the design data of the test part 10.

In sum, the subtraction of runtime-pictures of the ultrasonic signal is used to detect missing or additional CFRP-layers. Further details of the preferred embodiment are as follows:

A reference C-image is compared to the C-image of the test part, i.e. of the part 10 to be inspected. A "C-image" is for example a top view of the test object or part 10, in which the deviation of the sound attenuation or thickness is visualized, e.g. by different colors, color shades or shades of grey. The pixel value of each coordinate of the C-image of the reference part is compared and subtracted from the same coordinate of the C-image of the test part 10. Rejected test objects or parts are not allowed as a reference for the C-Scan-Subtraction-Method described here. The C-image is displayed on display 30 for visualizing the results.

The reference part or component is e.g. a reference shell which was averaged from various measurements. It may also be a theoretical reference, e.g. CAD data, or a component which was tested before, or a first sample. The reference component has to be formed equally to the test part 10 and has to be scanned with the same ultrasonic system and signal properties as the component or part 10 to be evaluated.

The subtraction is done with the mathematical formula described above. For this step, the data representing the C-image is loaded into computer unit 20. The mathematical formula is used to define that the C-image of the reference part is subtracted from the C-image of the test part 10. A predefined color palette which is provided in a data storage 21 can be selected for visualizing the deviations as described above.

Figure 2:
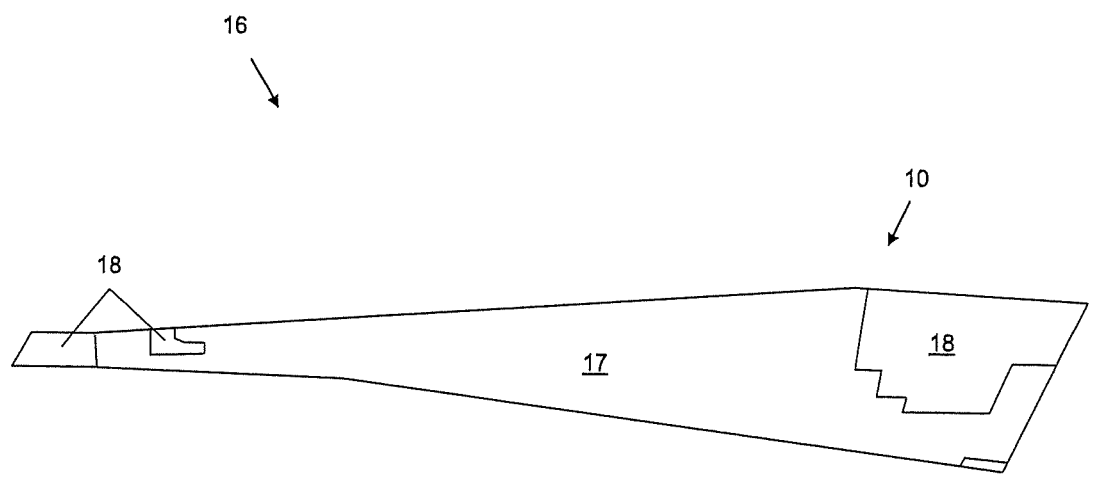
FIG. 2 depicts an image of a composite test part generated during the inspection, in which runtime differences between the composite test part and a composite reference part are shown.

The evaluation is described in the following:

FIG. 2 shows a simplified C-image 16 of the inspected component 10 as a top view, wherein differences between the reference part and the test part or component 10 are indicated. Runtime differences between the reference component and the component 10 to be evaluated are displayed in color on display 30.

The component 10 is checked for thickness differences. Missing CFRP-layers in areas 17 of image 16 appear in a first color on display 30, e.g. "red". Additional CFRP-layers appear in a second color, e.g. "green". Areas 18 showing a small thickness difference relative to the reference part, i.e. a difference below a predefined threshold, appear in a third color, e.g. "white". Of course, also other colors and different color shades can be used.

Measured values outside the color table are preferably shown in a further color, e.g. "black" in the subtracted image. These areas also need to be assessed. Since the laminate thickness deviation in such an area is very large, a delamination can be assumed, which is objected by the evaluation of "inner quality".

Delamination close to the back wall may appear as a missing layer in the subtracted C-image. A missing CFRP layer is an error characteristic. It can be assumed if it follows a geometric contour.

Then, the laminate thickness difference is checked for plausibility. The plausibility check is used to compare the color-pictured deviations to the subtracted image with compound thickness values provided by the ultrasonic facility or system 14. This ensures that the correct component is objected to if the sequence of components in the computer unit 20 has been reversed. The difference in thickness in the subtracted image is checked for plausibility.

The mathematical formula shown above determines that the reference part is subtracted from part 10 to be evaluated.

Consequently, a negative value of the laminate thickness in the generated C-image shows that the part 10 is thinner than the reference part at the respective checked coordinate. A positive value of the laminate thickness in the generated C-image shows that the part 10 to be evaluated, at the respective checked coordinate, is thicker than the reference part.

In addition to the above, the subtraction of amplitude images or data is used for the detection of missing or additional lightning protection layers, like e.g. an expanded copper foil.

For this purpose, a reference C-scan or -image is compared with the C-scan or image of the part 10 to be evaluated. The pixel values of each coordinate of the C-image of the reference part are subtracted from the pixel values with the same coordinate of the C-image of the part 10 to be evaluated. Components that have been rejected by the C-scan subtraction method must not be used as a reference for this procedure.

A file comprising the ultrasonic data of part 10 to be checked is processed with a file comprising the ultrasonic data of the reference part. The reference part is preferably the part, which is in the order behind a part. The reference part shall be equal to the part 10, i.e., it shall be produced on the basis of the same design data and shall be scanned by the same ultrasonic system 14 as part 10 to be evaluated.

The subtraction takes place by the mathematical formula as described above. The mathematical formula defines that the C-scan of the reference component is subtracted from the C-scan of the component 10 to be evaluated. Here, amplitude data are processed instead of runtime or thickness data. Further details regarding subtraction and visualization may be similar or equal.

Figure 3:
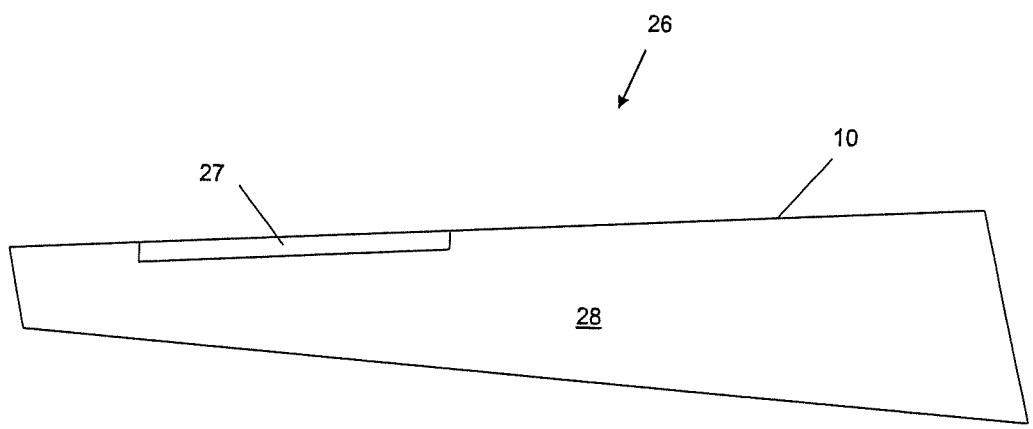
FIG. 3 depicts an image of a composite test part generated during the inspection, in which amplitude differences between the reference part and the test part to be evaluated are shown.
Figure 4:
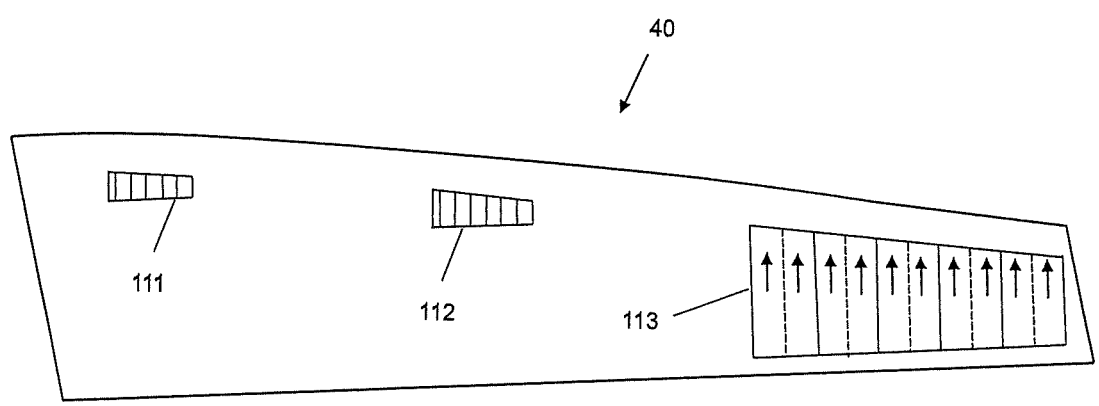
FIG. 4 depicts a prior art wing element of an aircraft, which is formed by a high number of layers or plies laid one upon the other.

The evaluation is described now with reference to FIG. 3. It shows schematically a simplified generated C-image 26 of the inspected component 10 as a top view, wherein amplitude differences between the reference part and the test part 10 to be evaluated are shown in different colors on display 30.

Here, part 10 is checked for missing or additional lightning protection layers. Missing lightning protection layers appear on display 30 in a first color, e.g. "red", while additional lightning protection layers appear in a second color e.g. "green". In the figure, area 27 of component 10 indicates one or more missing lightning protection layers.

Areas 28 showing only a small amplitude difference relative to the reference part, i.e. a difference below a predefined threshold, appear in a third color on display 30, e.g. "white". Of course, also other colors can be used.

A missing lightning protection layer can be assumed if the respective area follows a geometric contour. This fulfills the fault characteristic "missing layer". Unclear indications that do not follow a geometric contour and thus fulfill the fault characteristic "unidentifiable indications" are also objectable.

The amplitude difference is checked for plausibility. The plausibility check is used to compare the deviations displayed in color around the subtracted image with the amplitude values provided by the ultrasonic system 14. This ensures that the correct part is objected to if the sequence of part in the calculator has been reversed.

The amplitude difference in the subtracted C-image has to be checked for plausibility.

The mathematical formula specifies that the reference part is subtracted from the part 10 to be evaluated. Consequently, a positive amplitude value as indicated in the area 27 of the generated C-scan shows that the part 10 to be evaluated has a missing lightning protection position at the respective checked coordinate.

The subject matter disclosed herein can be implemented in software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

| List of reference signs | |
|---|---|
| 10 | composite part to be inspected/test part |
| 11 | layers |
| 12 | upper surface |
| 13 | bottom side |
| 14 | ultrasonic system |
| 15 | ultrasonic signal |
| 16 | image/C-image |
| 17 | areas with missing layers |
| 18 | areas with small thickness difference |
| 20 | computer unit |
| 21 | data storage |
| 26 | image/C-image |
| 27 | areas with missing layers |
| 28 | areas with small amplitude difference |
| 30 | display |
| 40 | wing element |
| 111 | first ply |
| 112 | second ply |
| 113 | third ply |
| D | thickness |

The invention claimed is:

1. A method for ultrasonic inspection of composite parts, comprising:
   providing a composite part to be inspected, the composite part comprising a plurality of layers;
   determining a runtime and/or attenuation of an ultrasonic signal propagating through the composite part to be inspected;
   providing a runtime and/or attenuation of the ultrasonic signal propagating through a reference composite part;
   subtracting the runtime and/or attenuation of the ultrasonic signal in the reference composite part from the runtime and/or attenuation of the ultrasonic signal in the composite part to be inspected, or vice versa; and
   determining from a result of the subtraction one or more missing and/or additional layers in the inspected composite part;
   wherein determining one or more missing and/or additional layers in the inspected composite part comprises:
      determining differences of a thickness between the inspected composite part and the reference composite part; and
      comparing the thickness differences between the inspected composite part and the reference composite part with the thickness of a layer of the inspected composite part to detect a missing or an additional layer.

2. The method according to claim 1, further comprising visualizing in an image a difference of the runtime and/or attenuation of the ultrasonic signal in the inspected composite part relative to the reference composite part, and/or the differences of the thickness between the inspected composite part and the reference composite part.

3. The method according to claim 1, wherein an image of the inspected composite part is generated, the image indicating for different coordinates a color value representing a deviation of the attenuation and/or run time of the ultrasonic signal in the inspected composite part compared to the reference composite part.

4. The method according to claim 1, wherein pixel values for coordinates in an image of the reference composite part are compared to and/or subtracted from pixel values at same coordinates in an image of the inspected composite part, the pixel values representing attenuation and/or run time of the ultrasonic signal in the respective part.

5. The method according to claim 1, wherein the runtime and/or attenuation determined for the inspected composite part is provided as reference data for inspection of one or more further composite parts.

6. The method according to claim 1, wherein the composite part to be inspected is scanned with the ultrasonic signal and the determined run time and/or attenuation is stored as a 2-dimensional matrix for the subtraction.

7. The method according to claim 1, wherein 2-dimensional patterns are determined from deviations of the runtime and/or attenuation of the ultrasonic signal of the inspected composite part compared to the reference composite part to identify areas of missing or additional layers and/or areas with reduced quality.

8. A device for ultrasonic inspection of composite parts, comprising:
    an ultrasonic system for determining a runtime and/or attenuation of an ultrasonic signal propagating through a composite part to be inspected; and
    a computer unit configured for subtracting a runtime and/or attenuation of an ultrasonic signal propagating through a reference composite part from the runtime and/or attenuation of the ultrasonic signal determined for the composite part to be inspected, or vice versa, for determining differences of a thickness between the inspected composite part and the reference composite part, for comparing the thickness differences between the inspected composite part and the reference composite part with the thickness of a layer of the inspected composite part, and for determining from a result of the comparing one or more missing and/or additional layers in the inspected composite part.

9. The device according to claim 8, further comprising a display to indicate areas of the inspected composite part where a missing and/or additional layer and/or a deviation of an inner quality of the inspected composite part is determined by the subtraction.

10. The device according to claim 8, configured for executing a method for ultrasonic inspection of composite parts, the method comprising:

providing a composite part to be inspected, the composite part comprising a plurality of layers;
determining a runtime and/or attenuation of an ultrasonic signal propagating through the composite part to be inspected;
providing a runtime and/or attenuation of the ultrasonic signal propagating through a reference composite part;
subtracting the runtime and/or attenuation of the ultrasonic signal in the reference composite part from the runtime and/or attenuation of the ultrasonic signal in the composite part to be inspected, or vice versa; and
determining from a result of the subtraction one or more missing and/or additional layers in the inspected composite part.

11. A computer program for ultrasonic inspection of composite parts, comprising program steps for:
    subtracting a runtime and/or an attenuation of an ultrasonic signal propagating through a reference composite part from a runtime and/or an attenuation of an ultrasonic signal in a composite part to be inspected, or vice versa,
    determining differences of the thickness between the inspected composite part and the reference composite part,
    comparing the thickness differences between the inspected composite part and the reference composite part with the thickness of a layer of the inspected composite part, and for
    determining from a result of the comparing one or more missing and/or additional layers in the inspected composite part.

12. The computer program according to claim 11, configured for executing a method for ultrasonic inspection of composite parts, the method comprising:
    providing a composite part to be inspected, the composite part comprising a plurality of layers;
    determining a runtime and/or attenuation of an ultrasonic signal propagating through the composite part to be inspected;
    providing a runtime and/or attenuation of the ultrasonic signal propagating through a reference composite part;
    subtracting the runtime and/or attenuation of the ultrasonic signal in the reference composite part from the runtime and/or attenuation of the ultrasonic signal in the composite part to be inspected, or vice versa; and
    determining from a result of the subtraction one or more missing and/or additional layers in the inspected composite part.

* * * * *

UNITED STATES PATENT AND TRADEMARK OFFICE
CERTIFICATE OF CORRECTION

| | | |
|---|---|---|
| PATENT NO. | : 12,209,992 B2 | Page 1 of 1 |
| APPLICATION NO. | : 17/876830 | |
| DATED | : January 28, 2025 | |
| INVENTOR(S) | : Patrick Peuker et al. | |

It is certified that error appears in the above-identified patent and that said Letters Patent is hereby corrected as shown below:

In the Specification

Column 5, Line 24: "Mid (2) - Mid (1)," should be -- $M_{i,j}(2) - M_{i,j}(1)$, --

Signed and Sealed this
Ninth Day of September, 2025

Coke Morgan Stewart
*Acting Director of the United States Patent and Trademark Office*